United States Patent
Oem et al.

(10) Patent No.: US 9,547,405 B2
(45) Date of Patent: Jan. 17, 2017

(54) TOUCH PANEL HAVING INTERSECTION STRUCTURES FOR SENSING PATTERNS

(71) Applicant: LG INNOTEK CO., LTD., Seoul (KR)

(72) Inventors: Seong Su Oem, Seoul (KR); Young Sun You, Seoul (KR); Sun Hwa Lee, Seoul (KR); Kwang Yong Jin, Seoul (KR); Yongjae Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 20 days.

(21) Appl. No.: 14/675,168

(22) Filed: Mar. 31, 2015

(65) Prior Publication Data

US 2015/0277634 A1 Oct. 1, 2015

(30) Foreign Application Priority Data

Mar. 31, 2014 (KR) .......................... 10-2014-0038133
Mar. 5, 2015 (KR) .......................... 10-2015-0031167

(51) Int. Cl.
*G06F 3/046* (2006.01)
*G06F 3/044* (2006.01)

(52) U.S. Cl.
CPC .............. *G06F 3/046* (2013.01); *G06F 3/044* (2013.01)

(58) Field of Classification Search
CPC ................................ G06F 3/041–3/047; G06F 2203/04101–2203/04113
USPC ......... 345/173–178; 178/18.01–18.09, 18.11
See application file for complete search history.

(56) References Cited

U.S. PATENT DOCUMENTS

| | | | |
|---|---|---|---|
| 9,122,358 B2* | 9/2015 | Liu | G06F 3/0416 |
| 2006/0234065 A1* | 10/2006 | Ohno | C01G 15/00 428/432 |
| 2008/0227308 A1* | 9/2008 | Fujii | G06F 3/0416 439/66 |
| 2010/0007628 A1* | 1/2010 | Eriguchi | G06F 3/045 345/174 |
| 2010/0253646 A1* | 10/2010 | Hiratsuka | G06F 3/044 345/174 |
| 2011/0032193 A1* | 2/2011 | Szalkowski | G06F 3/044 345/173 |
| 2011/0157762 A1* | 6/2011 | Kurashima | G06F 3/044 361/277 |

FOREIGN PATENT DOCUMENTS

| | | | |
|---|---|---|---|
| KR | 1020120062135 A | * | 6/2012 |
| KR | 10-2013-0108930 A | | 10/2013 |
| KR | 1020130091518 A | * | 12/2013 |
| KR | 1020130052155 A | * | 1/2014 |

* cited by examiner

*Primary Examiner* — Stephen Sherman
(74) *Attorney, Agent, or Firm* — KED & Associates, LLP

(57) ABSTRACT

A touch panel may have a pen touch and electrode touch function. More specifically, a touch panel may be capable of improving visibility of a view area and also simplifying a panel fabrication process by improving the wires of sensing patterns for a pen touch and disposing an overlap structure occurring between intersecting sensing patterns in a separate region other than a view area.

16 Claims, 12 Drawing Sheets

TOUCH PANEL HAVING INTERSECTION STRUCTURES FOR SENSING PATTERNS

CROSS REFERENCE TO RELATED APPLICATIONS

The present application claims the benefit and priority of Korean Patent Application No 10-2014-0038133, filed Mar. 31, 2014 and Korean Patent Application No. 10-2015-0031167 filed Mar. 5, 2015, the subject matters of which are incorporated herein by reference.

BACKGROUND

1. Field

Embodiments may relate to a touch panel having a pen touch and electrode touch function and, more particularly, to a touch panel capable of improving visibility of a view area and also simplifying a panel fabrication process by improving wires of sensing patterns for a pen touch and disposing an overlap structure occurring between intersecting sensing patterns in a separate region other than a view area.

2. Description of the Related Art

In recent years, types of smart phones and tablet computer products have been in the spotlight in which an electrostatic touch function driven by detected static electricity generated from a body of a user and a pen touch function driven by an induced current generated by an induction electromagnetic force generated by a touch pen have been combined.

In order to simultaneously implement an electrostatic touch function and a pen touch function using an induction electromagnetic force, in recent years, a structure in which both electrostatic patterns and sensing patterns are implemented in a single layer has been actively used rather than another structure in which an electrostatic pattern layer for an electrostatic type touch (hereinafter referred to as an electrostatic pattern) and an electromagnetic sensing pattern for detecting an induction electromagnetic force (hereinafter referred to as a sensing pattern) are stacked.

If the electrostatic patterns or the sensing patterns are implemented in a single layer as described above, however, a jumping structure, intersection structure, or overlap structure in which a plurality of patterns is intersected may be inevitably present. If a plurality of such overlap structures is present in a view area, there may be a problem in that visibility is reduced. Furthermore, there are disadvantages in terms of time, cost, and yield because processes in fabricating a panel are complicated and multi-staged. In order to solve such problems, there is a need for a new solution for excluding an overlap structure in a view area.

Embodiments have been made keeping in mind limits of such a touch panel device or touch panel fabrication method, and proposes a touch panel capable of increasing display visibility and simplifying a manufacturing process by improving wires of sensing patterns for a pen touch and disposing an overlap structure occurring between intersecting sensing patterns in a separate region other than a view area.

A related art includes Korean Patent Application Publication No. 2013-0108930 entitled "Tablet with Improved Line-Antenna Structure," the subject matter of which is incorporated herein by reference. The art presents a methodology capable of minimizing an intersection structure and also properly distributing the space occupied by a line antenna in order for the line antenna to enter a line selection circuit in an outer part of a loop antenna for determining the location of an electron pen.

Embodiments and the art may be similar in that a structure and process for a touch panel are improved by changing the arrangement of sensing patterns or line antenna, but are different in that in the art, electrostatic patterns and sensing patterns are not implemented in a single layer and a pattern intersection structure in a view area is not fully excluded.

SUMMARY OF THE INVENTION

Accordingly, an embodiment may provide a touch panel in which sensing patterns are implemented in two layers unlike in an art in which the sensing patterns are implemented in a single layer.

Furthermore, an embodiment may provide a touch panel in which the wires of sensing patterns on a substrate are improved and an overlap structure between sensing patterns is disposed in a separate region other than a view area.

Furthermore, an embodiment may provide a touch panel capable of reducing resistance in detecting an electric current by minimizing the length of sensing patterns and having an advantage of a bezel area by reducing the number of wires for sensing patterns.

An embodiment may provide a touch panel having an improved overlap structure for sensing patterns. Such a category of the embodiment is not limited to the term itself and may be extended and interpreted within the scope including the technical spirit to be described below.

In accordance with an embodiment, a touch panel may include a plurality of sensing patterns formed over a substrate and configured to detect a touch signal, wherein the plurality of sensing patterns may be formed in a mesh form. The mesh form may include a mesh line and an opening between the mesh lines, and the mesh line may have a line width of 0.1 µm or more and 10 µm or less. The touch panel may further include an overlap region that is placed over the substrate or a specific region other than the substrate and in which the plurality of sensing patterns may be intersected. The plurality of sensing patterns may be mutually insulated and intersected in the overlap region. Further, the overlap substrate may be formed in the overlap region, and the plurality of sensing patterns may be mutually insulated and intersected through a via hole formed in the overlap substrate. In another method, an overlap substrate on which an insulation layer is stacked may be formed in the overlap region, and the plurality of sensing patterns may be mutually insulated and intersected by the insulation layer.

The plurality of sensing patterns may include a plurality of first sensing patterns formed in the first surface of the substrate and a plurality of second sensing patterns formed in the second surface of the substrate. In this example, an overlap substrate may be formed in an overlap region, the plurality of first sensing patterns may be mutually insulated and intersected in the first surface of the overlap substrate, and the plurality of second sensing patterns may be mutually insulated and intersected in the second surface of the overlap substrate. The touch panel may further comprise a plurality of electrostatic patterns formed over the substrate and configured to detect an electrostatic input signal, and the plurality of sensing patterns may be disposed between adjacent electrostatic patterns.

In accordance with another embodiment, a touch panel may include a plurality of sensing patterns formed over a substrate and configured to detect a touch signal and a plurality of electrostatic patterns formed over the substrate and configured to detect an electrostatic input signal, wherein the plurality of sensing patterns and the plurality of electrostatic patterns may be alternately disposed in the active view area of the substrate. The touch panel may further include an overlap region which is placed over the substrate or a specific region other than the substrate and in which the plurality of sensing patterns may be intersected. In this example, the plurality of sensing patterns may be mutually insulated and intersected in the overlap region. In this example, the plurality of sensing patterns and the plurality of electrostatic patterns may be alternately disposed in the active view area of the substrate, and the plurality of sensing patterns may be disposed between adjacent electrostatic patterns.

Further, at least any one of the plurality of sensing patterns and the plurality of electrostatic patterns may be formed in a mesh form.

In another example, a plurality of first sensing patterns and a plurality of first electrostatic patterns may be formed in the first surface of the substrate, and a plurality of second sensing patterns and a plurality of second electrostatic patterns may be formed in the second surface of the substrate. An overlap substrate may be formed in the overlap region, the plurality of first sensing patterns may be mutually insulated and intersected in the first surface of the overlap substrate, and the plurality of second sensing patterns may be mutually insulated and intersected in the second surface of the overlap substrate.

In accordance with another embodiment, a touch panel may include a plurality of first sensing patterns formed in the first surface of a substrate and configured to detect a touch signal and a plurality of second sensing patterns formed in the second surface of the substrate and configured to detect a touch signal. In this example, the touch panel may further include an overlap region which is placed over the substrate or a specific region other than the substrate and in which the plurality of sensing patterns may be intersected. An overlap substrate may be formed in the overlap region, the plurality of first sensing patterns may be mutually insulated and intersected in the first surface of the overlap substrate, and the plurality of second sensing patterns may be mutually insulated and intersected in the second surface of the overlap substrate.

Embodiments may be implemented in the form of a display device including a touch panel, including a plurality of sensing patterns formed over a substrate and configured to detect a touch signal, wherein the plurality of sensing patterns is formed in a mesh form. In this example, the plurality of sensing patterns may include a plurality of first sensing patterns formed in the first surface of the substrate and a plurality of second sensing patterns formed in the second surface of the substrate.

Another embodiment may be implemented in the form of a display device including a touch panel, including a plurality of sensing patterns formed over a substrate and configured to detect a touch signal, a plurality of electrostatic patterns formed over the substrate and configured to detect an electrostatic input signal, and an overlap region which may be placed over the substrate or a specific region other than the substrate and in which the plurality of sensing patterns may be intersected, wherein the plurality of sensing patterns is mutually insulated and intersected in the overlap region.

In accordance with an embodiment, there are advantages in that process costs can be reduced and a process yield can be improved by separately implementing the sensing patterns, compared to disadvantageous arrangements implemented in only a single layer, in two layers.

In accordance with an embodiment, there is an advantage in that a degree of freedom in selecting a substrate can be increased because different types of substrates can be used without implementing patterns only on a glass substrate when fabricating a single layer.

In accordance with an embodiment, there are advantages in that resistance of conductive lines can be reduced by reducing the length of wires for sensing patterns and a bezel area can be reduced by reducing the number of wires.

In accordance with an embodiment, there is an advantage in that the visibility of a display can be improved by excluding an overlap structure in a view area.

BRIEF DESCRIPTION OF THE DRAWINGS

The embodiments will be described in detail with reference to the following drawings in which like reference numerals refer to like elements wherein.

DETAILED DESCRIPTION

Figure 1:
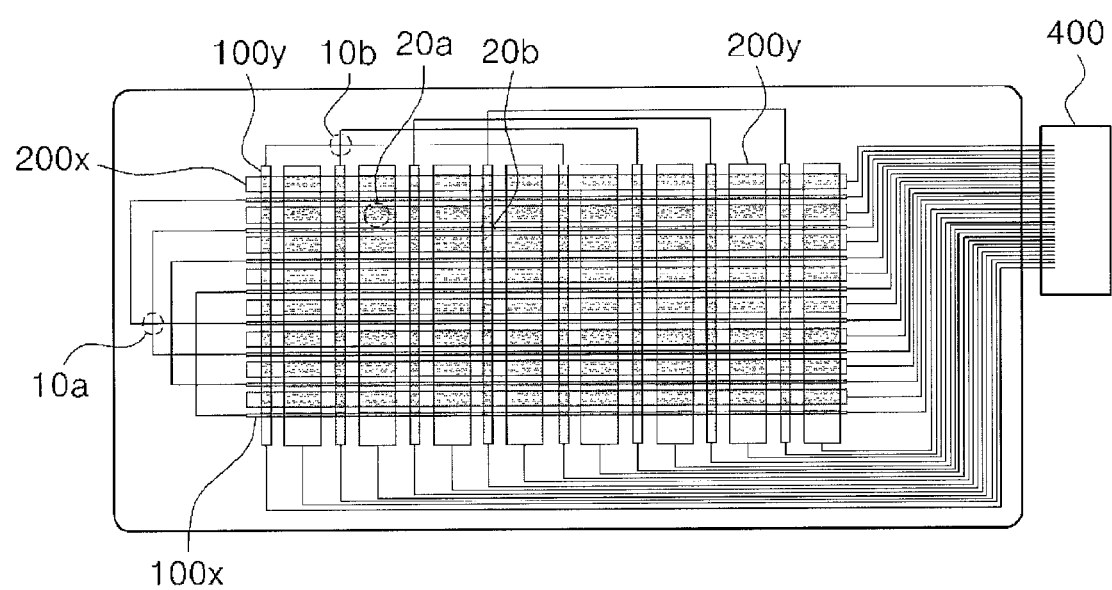
FIG. 1 illustrates an example in which electrostatic patterns and sensing patterns have been implemented.

The details of the objects and technical configurations of embodiments and corresponding acting effects may become more clearly understood from the following detailed description based on the drawings accompanied by the specification of embodiments. Hereinafter, embodiments are described in detail with reference to the accompanying drawings.

Embodiments disclosed in this specification should not be interpreted or used as limiting the scope of the embodiments. It is evident to those skilled in the art that a description including the embodiments of this specification may have various applications. Accordingly, some embodiments described in the detailed description are illustrative for a better description, and the scope of the embodiments is not intended as being limited to the embodiments.

Functional terms illustrated in the drawings and described below are only examples of possible expressions. In other embodiments, different terms may be used without departing from the spirit and scope of the detailed description.

It should be understood that an expression that some elements are "included" is an expression of an "open type" and the expression simply denotes that the corresponding elements are present, but does not exclude additional elements.

The meaning that each layer (or film), an area or region, patterns, or structures are formed "over/on" or "under/below" a substrate, each layer (or film), an area or region, a pad, or patterns includes that they are directly formed "over/on" or "under/below" the substrate, layer (or film), area or region, pad, or patterns and that they are formed "over/on" or "under/below" the substrate, layer (or film), area or region, pad, or patterns with a third layer interposed therebetween.

When one element is described as being "connected" or "coupled" to the other element, it should be understood that one element may be directly connected or coupled to the other element, but a third element may be interposed between the two elements.

Terms, such as the first and the second, may be used to describe various elements, but elements are not restricted by the terms. The terms are used to only distinguish one element from the other element.

FIG. 1 illustrates an example in which electrostatic patterns and sensing patterns have been implemented.

As described above, in recent years, there is a growing interest in a touch panel in which both an electrostatic pattern 200 capable of detecting static electricity generated from a body of a user and a sensing pattern 100 capable of detecting an induction electromagnetic force generated from a touch pen are included. FIG. 1 illustrates an example in which the electrostatic pattern 200 and the sensing pattern 100 are included in a single touch panel.

As illustrated in FIG. 1, both the electrostatic pattern 200 and the sensing pattern 100 are disposed in a single layer. More specifically, assuming that a horizontal direction is an X-axis direction and a vertical direction is a Y-axis direction based on FIG. 1, pattern wires in each axis have been implemented to overlap on a single substrate. In this example, structures 10 and 20 in which patterns or conductive lines are intersect are inevitably present. A structure, such as that of FIG. 1, is called a G2 structure in which patterns of a single layer are basically formed on a single base substrate.

More specifically, in the example of FIG. 1, the electrostatic pattern 200 includes a plurality of sections 20a and 20b in which electrostatic patterns 200x and 200y arranged in the X axis and Y axis directions have been intersected in a state in which they have been insulated. This is the example with the sensing pattern 100. In particular, the sensing pattern 100 is extended in a loop shape, and the plurality of electrostatic patterns 200x and 200y is included in the loop. In this example, a plurality of extension conductive lines for the sensing pattern 100 overlaps in the outskirt region of the substrate, resulting in a plurality of intersection sections 10a and 10b.

If many intersection sections are present as described above, however, a large amount of insulating materials is required and a manufacturing process is complicated and multi-staged. As a result, there may be problems in that a unit price of a touch panel is increased and a process yield is greatly lowered.

A substrate having a small change (i.e., a substrate including glass as a main ingredient) may be inevitably used because many patterns need to be wired on a single substrate. Accordingly, there may be a problem in that the type of available substrates is very limited.

A touch panel in accordance with an embodiment is described below with reference to FIG. 2.

Figure 2:
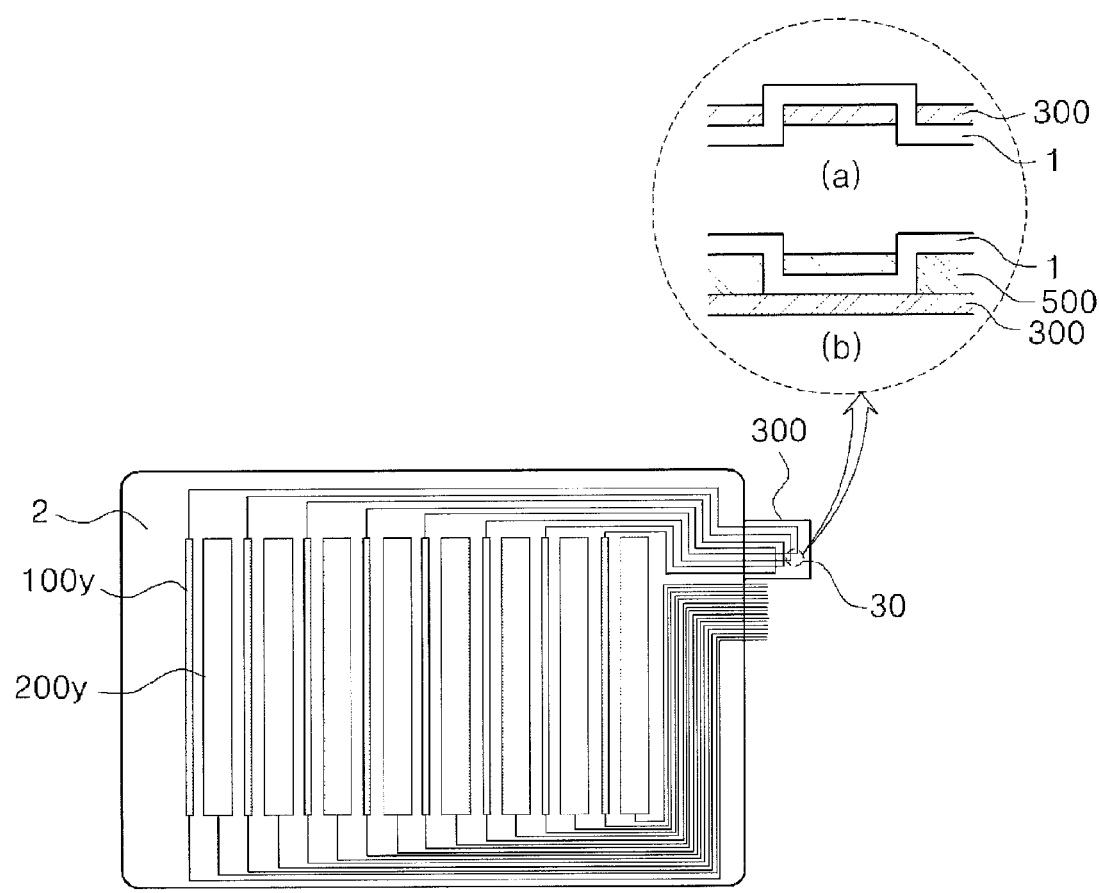
FIG. 2 illustrates an example in which electrostatic patterns and sensing patterns have been implemented in a single layer in accordance with an embodiment.

Referring to FIG. 2, the touch panel includes a plurality of sensing patterns 100y and an overlap substrate (or overlap region) 300. The plurality of sensing patterns 100y may be mutually insulated and intersected in the overlap substrate 300.

In the touch panel in accordance with an embodiment, unlike in the touch panel of FIG. 1, it is based on the premise that the patterns are arranged in a single layer only in one of the X axis direction and the Y-axis direction. If the patterns are implemented in two layers in the X and Y directions and stacked to form the touch panel (having a GFF structure) as described above, there may be advantages in that the process can be simplified, the manufacturing cost can be reduced, and yield of completed products can be significantly increased.

Unlike the touch panel of FIG. 1, the touch panel in accordance with an embodiment may further include the overlap substrate 300 that intersects conductive lines 1 extended from the plurality of sensing patterns 100y. In particular, the overlap substrate 300 is provided in a specific region of a base substrate 2 or a specific region outside the base substrate 2. The intersection structures 30 of the sensing patterns 100y are implemented to be intersected in the overlap substrate 300.

The overlap substrate 300 may be placed in a specific region of the substrate 2, that is, an active view areas in which a display is implemented or the outskirt region of the substrate 2 through which the conductive lines 1 extended from the electrostatic patterns 200y or sensing patterns 100y pass (i.e., a bezel area). In some embodiments, the overlap substrate 300 may be placed in the outside region of the substrate 2 outside the outskirt region of the substrate 2. The overlap substrate 300 may be included in the substrate 2 or may be formed outside the substrate 2.

As described above, in accordance with an embodiment, a process for manufacturing the touch panel can be significantly simplified because the intersection structures 30 inevitably present all over the substrate in the other art may be present only in the specific region. Further, problems attributable to the intersection structures can be problems because a user can design the intersection structures 30 so that they are placed on a specific region of the substrate or in a specific region other than the substrate.

An embodiment may also be applied to a structure in which sensing patterns are implemented on one surface of the single layer in the X-axis direction and the electrostatic patterns 200y are implemented on the other surface of the single layer in the Y-axis direction (e.g., a GF2 structure).

The overlap substrate 300 may include a separate substrate in which the intersection structures 30 of the conductive lines 1 extended from the overlap substrate 300 (i.e., the sensing pattern 100y) can be easily formed. Accordingly, a user can implement the intersection structures 30 of the sensing patterns 100y in various forms.

For example, as shown in FIG. 2(a), if a via hole is perforated in the overlap substrate 300 so that the conductive lines 1 extended from the sensing patterns 100 pass through a Π shape based on the overlap substrate 300, the sensing patterns 100 may be mutually insulated and formed in the intersection structures 30 because the overlap substrate 300 functions as an insulator.

In another embodiment in which the intersection structures 30 are formed, as shown in FIG. 2(b), an insulating layer 500 may be stacked on the overlap substrate 300 so that the conductive lines 1 extended from the plurality of sensing patterns 100 form the intersection structures 30 through the insulating layer 500. That is, if the insulating layer 500 is stacked on the overlap substrate 300 and the intersection structures 30 are formed using the insulating layer 500, a complicated process is not required and a cost can be significantly reduced compared to another art in which the intersection structures are formed on the entire substrate. Accordingly, an embodiment in which the intersection structures 30 between the sensing patterns 100y are formed on the overlap substrate 300 as described above may be taken into consideration.

In accordance with an embodiment, the layer or the base substrate 2 may be implemented using glass or a common transparent substrate including a film.

The substrate 2 may be rigid or flexible. For example, the substrate 2 may be made of glass or plastic. More specifically, the substrate 2 may include chemically enhanced/semi-enhanced glass, such as soda lime glass or alumino silicate glass, may include enhanced or flexible plastic, such as polyimide (PI), polyethylene terephthalate (PET), propylene glycol (PPG), or polycarbonate (PC), or may include sapphire. Further, the substrate 2 may include an optically isotropic film. For example, the substrate 2 may include cyclic olefin copolymer (COC), cyclic olefin polymer (COP), optically isotropic polycarbonate (PC), or optically isotropic polymethyl methacrylate (PMMA). The sapphire can significantly increase touch response speed because it has excellent electrical characteristics, such as a dielectric constant, can easily implement a space touch, such as hovering, and can be applied as a cover substrate because it has high surface strength. Hovering means a technology in which coordinates are recognized even at a location slightly far from a display.

The substrate 2 may be bent while partially having a curved surface. That is, the substrate 2 may partially have a plane, and may be bent while partially having a curved surface. More specifically, the end of the substrate 2 may have a surface including a bent or random curvature while having a curved surface, and may be bent or curved.

The substrate 2 may include a flexible substrate including a flexible characteristic.

The substrate 2 may include a curved or bent substrate. That is, the touch panel including the substrate 2 may be formed to have a flexible, curved, or bent characteristic. Accordingly, the touch panel in accordance with an embodiment can be easily carried and changed in various designs.

The substrate 2 may include a cover substrate. That is, the sensing patterns 100y, the electrostatic patterns 200y, and the conductive lines 1 may be supported by the cover substrate. Alternatively, a separate cover substrate may be further disposed on the substrate 2. That is, the sensing patterns 100y and the electrostatic patterns 200y may be supported by the substrate 2, and the substrate and the cover substrate may be coalesced (or bonded) through an adhesion layer.

Active view areas AA and non-active view areas UA may be defined in the substrate. An image may be displayed on the active view areas AA. An image may not be displayed in the non-active view areas UA disposed around the active view areas AA. The location of an input device (e.g., a finger) may be detected in at least one of the active view area AA and the non-active view area UA. When an input device, such as a finger, comes in contact with such a touch panel, a difference in capacitance is generated from a portion with which the input device comes in contact. A portion where such a difference is generated can be detected as a contact location.

The pattern or an electrode having the same meaning as the pattern may include a transparent conductive substance through which electricity can flow while not hindering the transmission of light. For example, the electrode may include metal oxide, such as indium tin oxide (ITO), indium zinc oxide (IZO), copper oxide, tin oxide, zinc oxide, or titanium oxide. The electrode may include a nano wire, a photoresist nano wire film, carbon nano tube (CNT), graphene, conductive polymer, or various types of metal. For example, the electrode may be made of chrome (Cr), nickel (Ni), copper (Cu), aluminum (Al), silver (Ag), molybdenum (Mo) or alloys of them.

The patterns formed in the view area or active area may be implemented using a transparent conductive substance, such as ITO, Cu mesh, or Ag mesh. That is, the patterns made of the aforementioned substance may be implemented in a mesh shape and may be effectively used to improve display visibility. The conductive lines 1 extended from the patterns may be made of various substances including a stack type substance, such as ITO, Cu mesh, Ag mesh, Cu, Ag, or metal nitride oxide.

Figure 3:
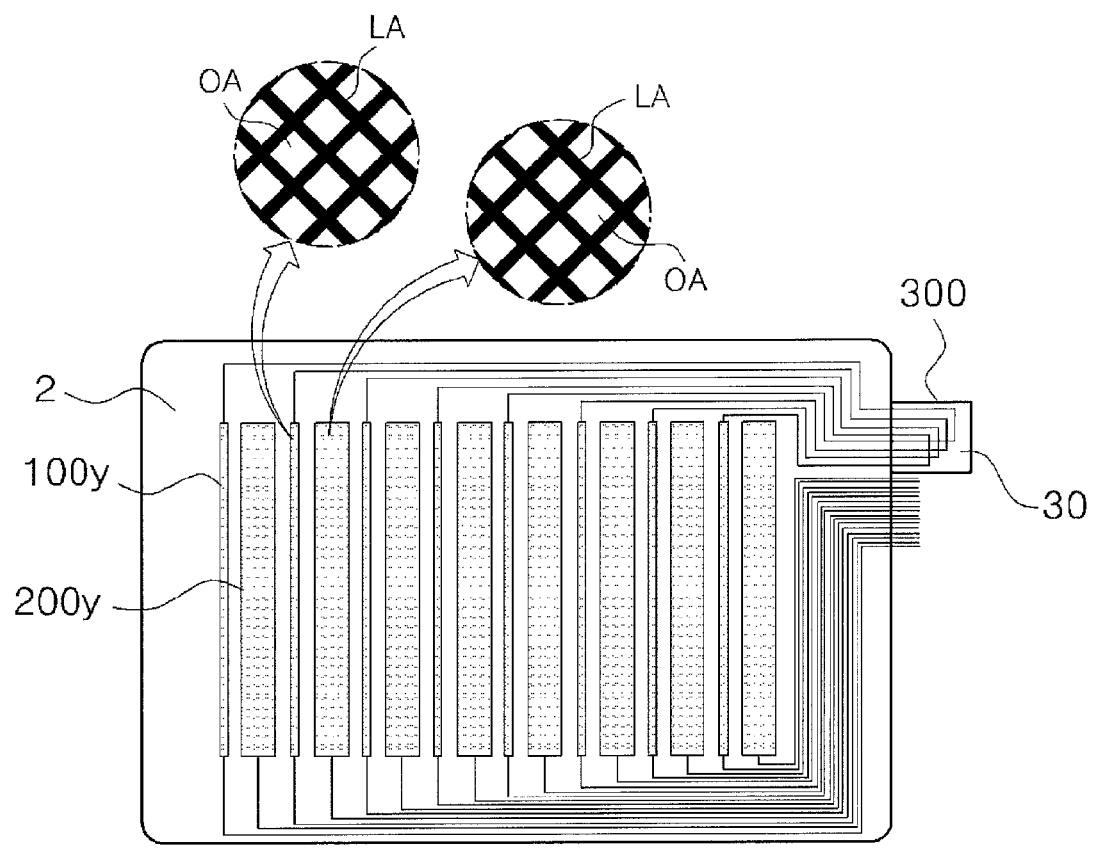
FIG. 3 illustrates electrostatic patterns and sensing patterns in accordance with another embodiment.

FIG. 3 illustrates electrostatic patterns 200y and sensing patterns 100y in accordance with another embodiment.

Conductive patterns for forming the sensing patterns 100y or electrostatic patterns 200y in accordance with an embodiment may have a mesh structure having mesh lines and mesh openings.

The conductive patterns may be made of a conductive substance, such as metal paste including metal that includes at least one of Cr, Ni, Cu, Al, Ag, Mo, and an alloy of them.

The conductive patterns may include a plurality of sub-patterns. The sub-patterns may be intersected and disposed in a mesh shape. More specifically, the sub-patterns may include mesh lines LA and mesh openings OA between the mesh lines LA due to the plurality of sub-patterns intersected in a mesh shape. The mesh line LA may have a line width of about 0.1 μm to 10 μm. If the line width of the mesh line LA is less than about 0.1 μm, a process of manufacturing the mesh line part may be impossible or the mesh lines may be short-circuited. If the line width of the mesh line LA exceeds about 10 μm visibility may be reduced because the patterns are viewed externally. The line width of the mesh line LA may be about 0.5 μm to about 7 μm. In particular, the line width of the mesh line may be about 1 μm to about 3.5 μm.

The mesh opening OA may have various shapes. For example, the mesh opening OA may have various shapes, such as a circle and polygon, such as a square, a diamond shape, a pentagon, and a hexagon. The mesh opening OA may be formed in a regular or random shape.

Active view areas, for example, the patterns may not be viewed on a display area because the sensing patterns 100y or the electrostatic patterns 200y have such a mesh shape. That is, although the sensing patterns 100y or the electrostatic patterns 200y are made of metal, the patterns may not be seen. Resistance of a large-sized touch panel can be lowered although the patterns are applied to a large-sized touch panel.

Wires (i.e., conductive lines 1) may have a mesh structure in addition to the sensing patterns 100y and the electrostatic patterns 200y.

In an embodiment, the mesh structure of the sensing patterns 100y or the electrostatic pattern 200y may be formed by disposing a metal layer on the front surface of a substrate 2 and etching the metal layer in a mesh shape. For example, the copper metal mesh electrodes of an embossed mesh shape may be formed by depositing metal, such as copper (Cu), on the front surface of the substrate 2, such as polyethyleneterephthalate, and etching the Cu layer.

In another embodiment, the mesh structure may be formed by forming a resin layer (or a middle layer), including photopolymer resin (UV resin) or thermosetting resin, on the substrate 2, forming the engraved patterns of a mesh shape on the resin layer, and filling the engraved patterns with a conductive substance. In this embodiment, the engraved patterns on the resin layer may be formed by imprinting a mold having embossed patterns. The conductive substance may be metal paste including metal, including at least one of Cr, Ni, Cu, Al, Ag, Mo, and an alloy of them. Accordingly, the patterns of an engraved mesh shape may be formed by filling the engraved patterns of a mesh shape with metal paste and hardening the metal paste or plating the metal paste.

In yet another embodiment, a resin layer (or a middle layer) including photopolymer resin (UV resin) or thermosetting resin may be formed on the substrate 2. Embossed or engraved nano patterns and micro patterns of a mesh shape may be formed in the resin layer. A metal layer made of at least one of Cr, Ni, Cu, Al, Ag, Mo and an alloy of them may be deposited on the resin layer using a sputtering process. The embossed patterns of the nano patterns and micro patterns may be formed by imprinting a mold having engraved patterns. The engraved patterns may be formed by imprinting a mold having the embossed patterns. Next, the patterns of a mesh shape may be formed by etching the metal layer formed on the nano patterns and the micro patterns so that only the metal layer formed on the nano patterns is removed and only the metal layer formed on the micro patterns remains intact. When etching the metal layer, the etching rate may be different depending on a difference in the bonding area between the nano patterns and micro patterns and the metal layer. That is, an electrode substance formed on the micro patterns is less etched because the bonding area of the micro patterns and the metal layer is larger than the bonding area of the nano patterns and the metal layer. The metal layer formed on the micro patterns remains and the metal layer formed on the nano patterns is etched and removed at the same etching rate. As a result, the patterns of the embossed or engraved mesh-shaped patterns of the micro patterns may be formed on the substrate 2.

The overlap substrate 300 may be formed of a flexible printed circuit board (FPCB). If an FPCB is used as the overlap substrate 300, an overlap portion may be bent or curved by elasticity on the nature of the FPCB. Accordingly, the FPCB may be attached to at least one of both surfaces of the substrate 2 in the state in which it has been bent. In this embodiment, there may be advantages in that a view area/touch region may have a maximum area and a bezel area may have a minimum area.

Figure 4:
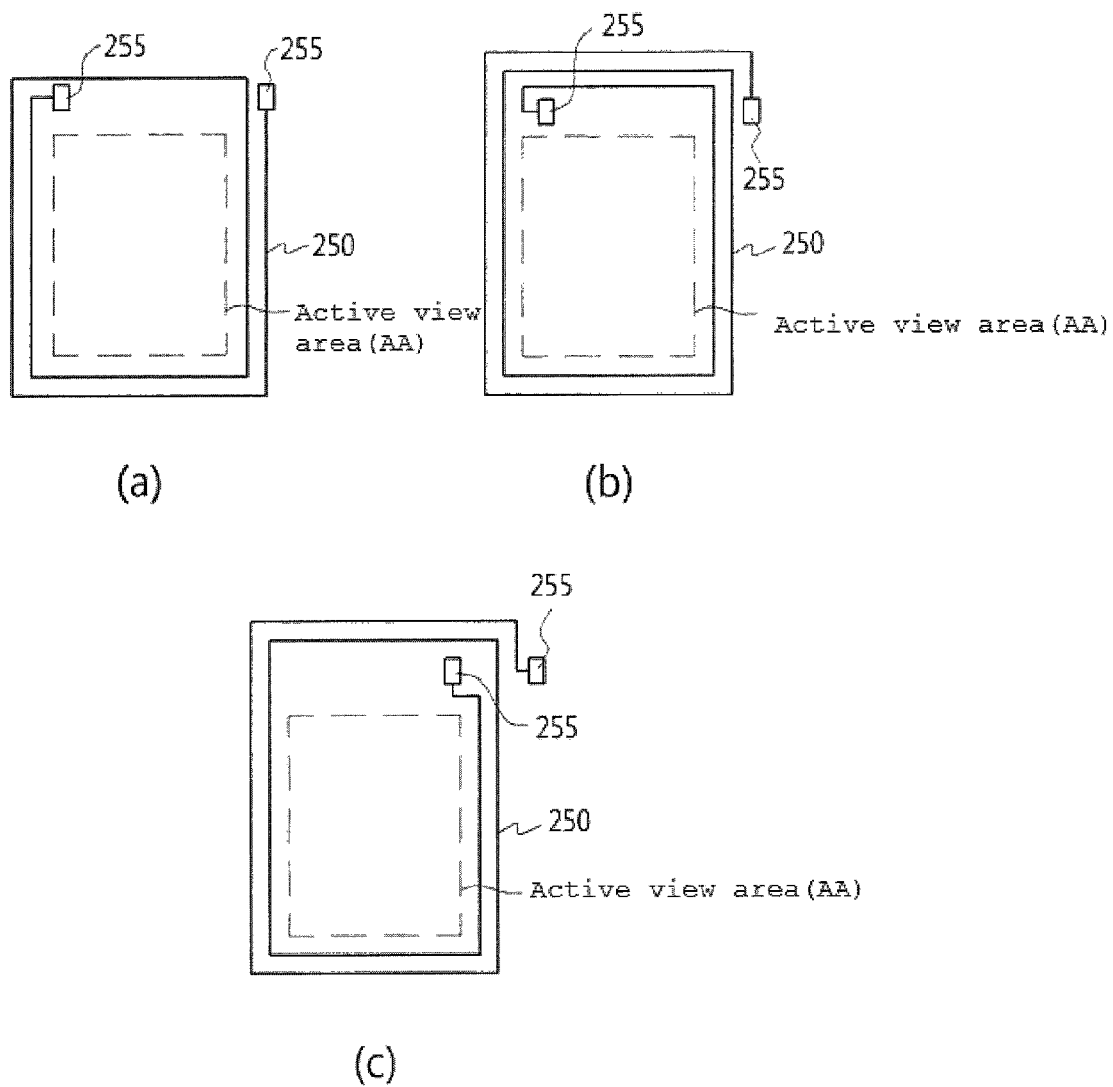
FIG. 4 illustrates a touch panel including power coil patterns in accordance with another embodiment.

As shown in FIG. 4, in another embodiment, if a wire is formed on a base substrate, a power coil pattern 250 surrounding the wires at least once is formed in the outskirt of the wire. If the power coil pattern 250 starts from one side between the outermost pattern of the wire and the substrate 2, the power coil pattern 250 formed to surround the wires from one side (i.e., the start point) at least once is connected in a single line form and formed up to the other end (i.e., the end point) without disconnection.

In this example, one end and the other end of the power coil pattern 250 may be connected to a pad 255 formed to supply power to the power coil pattern 250. If the pad 255 has only to be electrically connected to the power coil pattern 250, the shape and size of the pad 255 are not limited.

One end and the other end of the power coil pattern 250 are connected to the respective pads 255. In this example, the power coil pattern 250 is connected in a single line form without an overlap portion in the power coil pattern 250.

FIGS. 4(a), 4(b), and 4(c) are diagrams schematically illustrating some embodiments of such a power coil pattern 250. In some embodiments of the power coil pattern 250, the power coil pattern 250 may be formed in a single line form without an overlap and may be implemented in various forms if one end and the other end of the power coil pattern 250 are connected to the respective pads 255.

The power coil pattern 250 in accordance with an embodiment may include metal oxide, such as indium tin oxide (ITO), indium zinc oxide (IZO), zinc oxide (ZnO), copper oxide, tin oxide, zinc oxide, or titanium oxide, a nano wire, a photoresist nano wire film, carbon nano tube (CNT), conductive polymer, graphene, or various types of metal, including copper (Cu), gold (Au), silver (Ag), aluminum (Al), titanium (Ti), nickel (Ni), and an alloy of them. The power coil pattern 250 may be formed in the aforementioned mesh shape.

Figure 5:
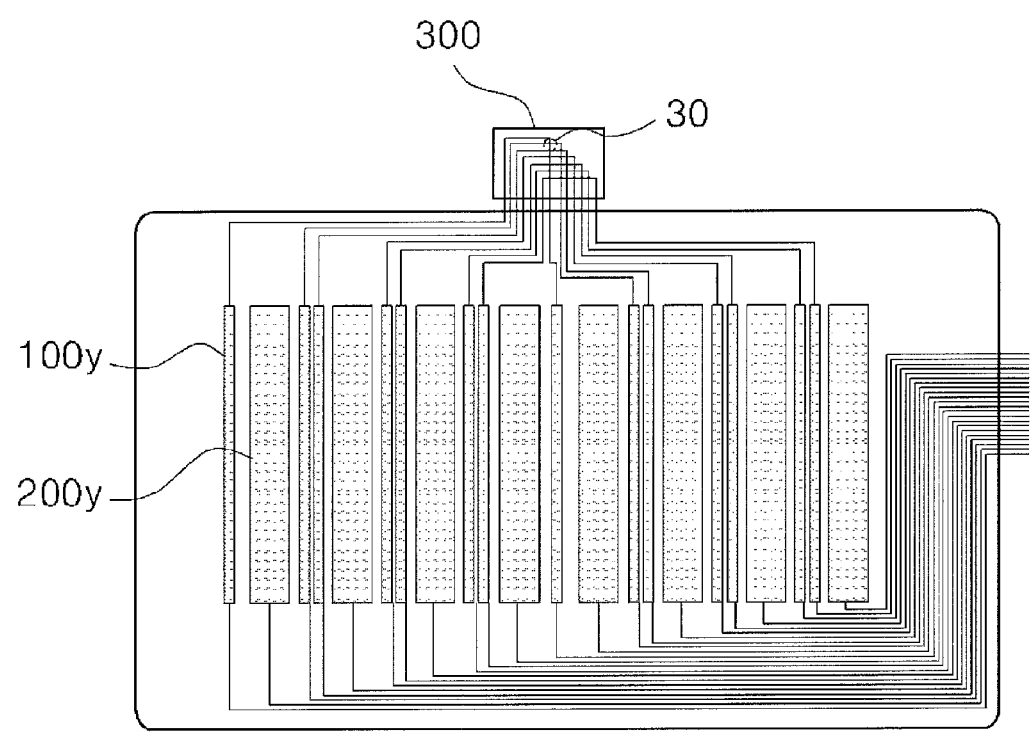
FIG. 5 illustrates an example in which electrostatic patterns and sensing patterns have been implemented in another form.

FIG. 5 illustrates an embodiment in which the overlap substrate 300 is placed in another region in accordance with yet another embodiment.

As described above, the overlap substrate 300 may be disposed in a specific region outside the view area.

That is, if the sensing patterns 100y have a loop shape and a condition in which a specific number of the electrostatic patterns 200y are included in a single loop is satisfied, the overlap substrate 300 in which the intersection structures 30 are formed may be disposed in a specific region other than the view area as long as the sensing patterns 100y maintain the loop shape. A user who uses the degree of freedom in the design can select the location of the overlap substrate 300 where the length of the conductive lines 1 extended from the sensing patterns 100y is a minimum and may achieve corresponding technical effects.

As shown in FIG. 5, the touch panel in accordance with an embodiment may include the plurality of sensing patterns 100y formed between the electrostatic patterns 200y. In the example of FIG. 5, two sensing patterns 100y have been illustrated as being formed between two electrostatic patterns 200y, but the embodiments are not limited thereto.

More specifically, an arrangement method, such as that of FIG. 5, can minimize the length of the conductive lines 1 extended from the respective sensing patterns 100y compared to the method of FIG. 2. Accordingly, a loss of an electrical signal that passes through the patterns can be reduced because resistance of the conductive lines 1 is reduced.

A touch panel structure in which two layers have been stacked is described in detail below with reference to FIG. 6 and FIG. 7.

FIGS. 6(a) to 6(d) illustrate a structure in which two layers have been stacked in accordance with an embodiment.

As described above with reference to FIG. 2, in an embodiment, it is based on upon the premise that only the sensing and electrostatic patterns 100 and 200 have been arranged in a single layer in any one of the X-axis direction and Y-axis direction. In contrast, the touch panel illustrated in FIG. 6(a) has a structure in which two layers in which the sensing and electrostatic patterns 100 and 200 are arranged in the X-axis and Y-axis directions are stacked. In this description, a layer in which the X-axis direction patterns 100x and 200x are arranged is called a first layer 600, and a layer in which the Y-axis direction patterns 100y and 200y are arranged is called a second layer 800, for ease of description.

Referring to FIG. 6(b), the first layer 600 and the second layer 800 are stacked on the top and bottom surfaces of an adhesion layer 700 with the adhesion layer 700 interposed therebetween. In this example, the adhesion layer 700 may be optically clear adhesives.

FIG. 6(c) illustrates a structure in which the X-axis direction patterns 100x and 200x are arranged on the top surface of a single layer 600 and the Y-axis direction patterns 100y and 200y are arranged on the bottom surface of a single layer 600. FIG. 6(d) illustrates a structure in which the X-axis direction patterns 100x and 200x are formed on the top surface of the single layer 600, a middle layer 900 is formed on the single layer 600, and the Y-axis direction patterns 100y and 200y are formed on the middle layer 900.

If the sensing patterns 100x and 100y are separately formed in separate layers in the X-axis and Y-axis directions and the separate layers are simply combined as described above, insulation between the sensing patterns 100x and 100y can be effectively improved compared to the example where the sensing patterns 100x and 100y are arranged in a single substrate in both the X-axis and Y-axis directions as in FIG. 1. There may be an advantage in that the process can be significantly simplified because a completed touch panel can be fabricated by only stacking the layers.

From FIG. 6(a), it may be seen that the first layer 600 and the second layer 800 include separate overlap substrates in which the intersection structures of the sensing patterns 100x and 100y are formed.

In the first layer 600, the overlap substrate 300 is disposed in the left region of the substrate, and the conductive lines 1 extended from the X-axis direction sensing patterns 100x may be implemented to form the intersection structures 30 only within the left region of the substrate.

In the second layer 800, the overlap substrate 450 is disposed in the right region of the substrate, and the conductive lines 1 extended from the Y-axis direction sensing patterns 100y may be implemented to form the intersection structures 30 only within the right region of the substrate.

Figure 6:
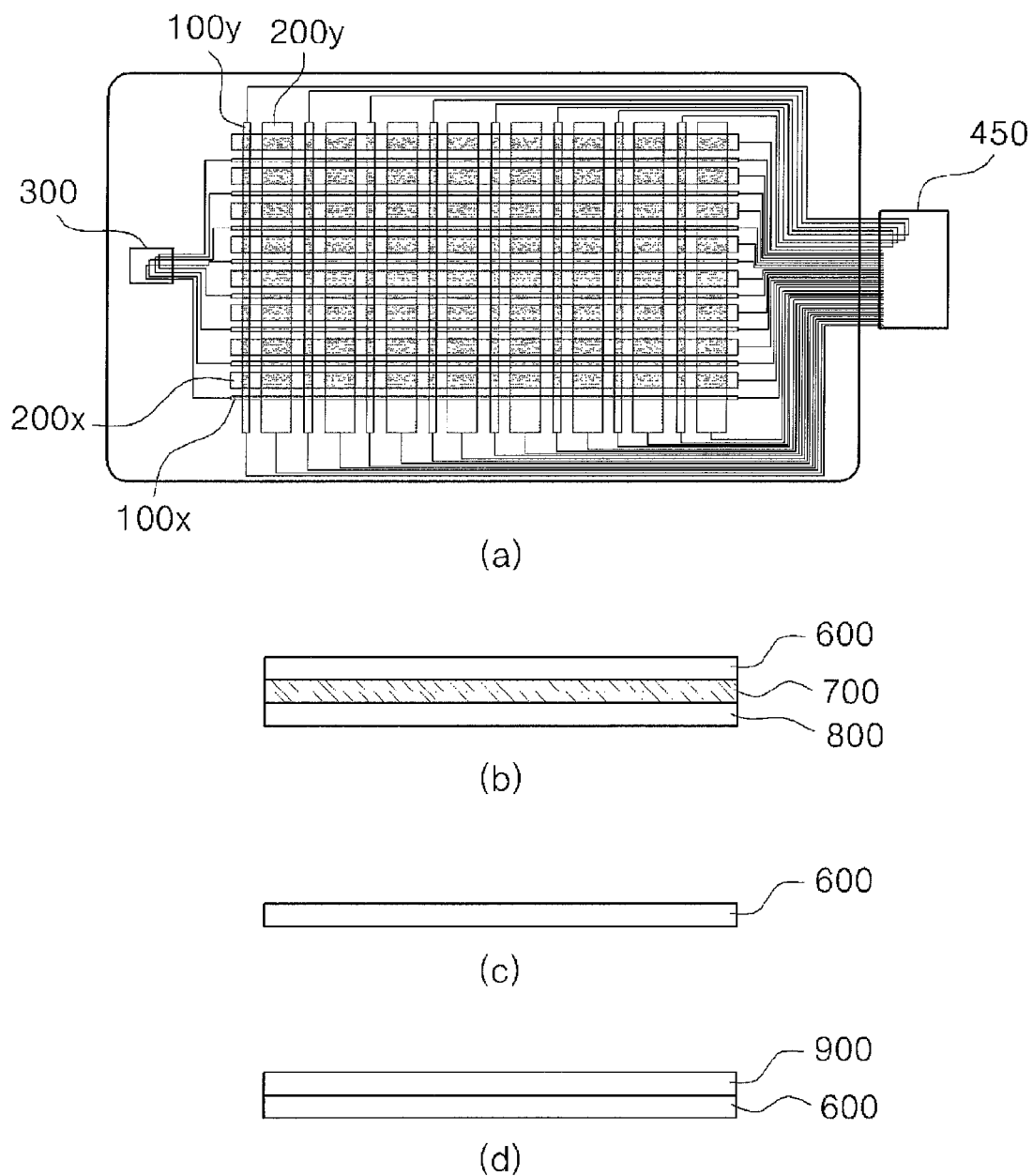
FIG. 6 illustrates an example in which electrostatic patterns and sensing patterns have been implemented in two layers in accordance with an embodiment.

FIG. 6 illustrates that the two layers 600 and 800 include the separate overlap substrates. In some embodiments, the two layers may share a single overlap substrate so that the overlap structures of the patterns are formed. For example, the central part of the single overlap substrate may be cut in a plane direction so that the patterns of a first layer is connected to one surface of the overlap substrate and the patterns of a second layer is connected to the other surface of the overlap substrate.

The overlap substrate may also be implemented as a so-called integration type substrate 450 combined with a driving substrate 400 (refer to FIG. 7) for controlling the input and output of the signals of the electrostatic pattern 200 and the sensing patterns 100. That is, both a portion for connecting the conductive lines 1 to which the input and output of the electrostatic pattern 200 and sensing patterns 100 may be connected and an overlap substrate in which the intersection structures 30 of the conductive lines 1 extended from the sensing patterns 100y may be formed may be disposed in the driving substrate 400. FIG. 6 illustrates an embodiment in which the intersection structures 30 of the first layer 600 are formed in a separate overlap substrate and the intersection structures 30 of the second layer 800 are formed in the integration type substrate 450 combined with the driving substrate 400. Accordingly, the completed touch panel includes a total of the two substrates.

Figure 7:
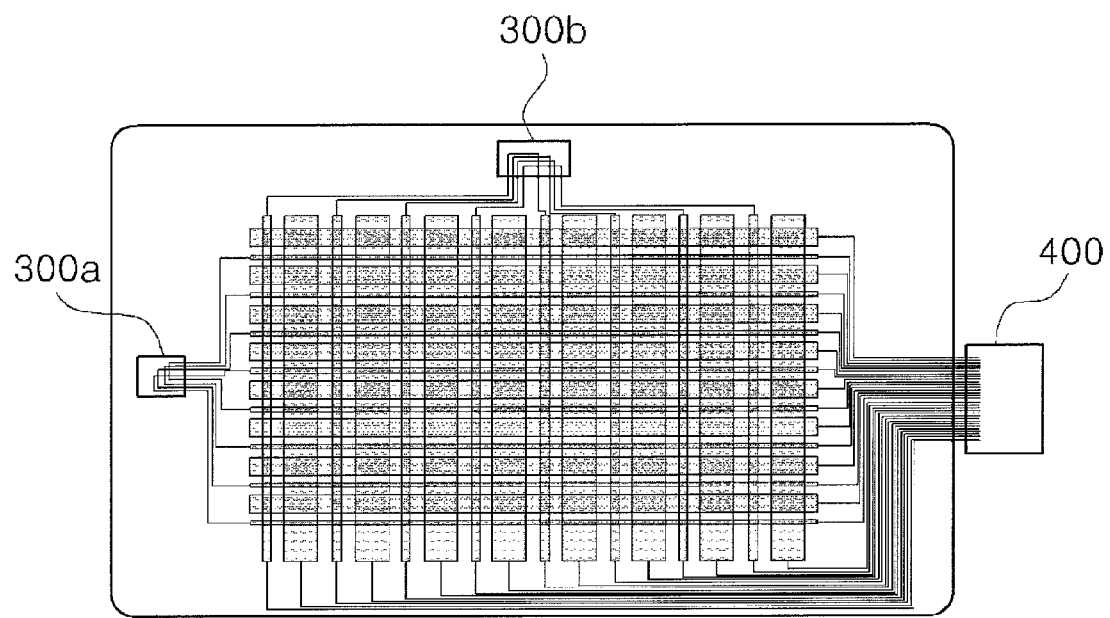
FIG. 7 illustrates an example in which electrostatic patterns and sensing patterns have been implemented in two layers in yet another form.

FIG. 7 illustrates a touch panel structure in which two layers are stacked along with the adhesion layer 700. The touch panel structure of FIG. 7 is the same as that of FIG. 6 except that the location of the overlap substrate 300 in which the intersection structures of the second layer are formed is different.

That is, the touch panel structure shown in FIG. 7 illustrates an embodiment in which the intersection structures of the first layer 600 and the second layer 800 are formed in the driving substrate 400 and separate overlap substrates 300a and 300b independent from the driving substrate 400, thereby implementing the touch panel using a total of the three substrates.

If the independent overlap substrates 300a and 300b are used in the respective layers as described above, the length and number of wires extended to the outskirt of the view area can be reduced. In this example, there may be advantages in that the width and size of a bezel can be reduced and a loss of an electrical signal can be minimized because resistance of the conductive lines 1 is reduced.

The sensing patterns, the electrostatic patterns, the wires, and the conductive lines of FIGS. 6 and 7 may have the aforementioned mesh structure. The touch panel of FIGS. 6 and 7 may further include the power coil patterns 250. In FIGS. 6 and 7, the overlap substrate 300 may be disposed in the outside region of the substrate 2 like the driving substrate 400.

Figure 8:
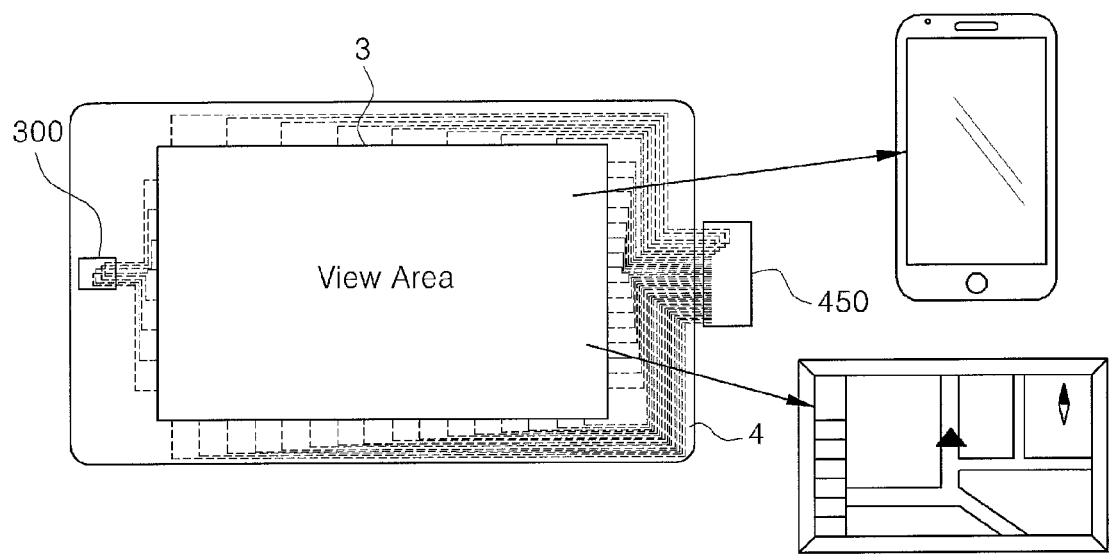
FIGS. 8 to 12 are diagrams illustrating examples to which the touch panels in accordance with various embodiments of the present invention have been applied.

FIG. 8 is a diagram illustrating the application of a display device including the touch panel in accordance with an embodiment.

The touch panel described above in accordance with an embodiment may include all of display devices having a touch function, and may be applied in various ways. More specifically, the touch panel in accordance with an embodiment may be included in a variety of types of display devices that require a touch function, such as mobile communication terminals including smart phones, PDAs, and tablets, instrument panels within vehicles and navigators, and display terminals that may be installed indoors and outdoors.

FIG. 8 is an exemplary diagram of the touch panel included in various display devices. FIG. 8 illustrates a view area 3 in which the sensing patterns and the electrostatic patterns are formed, the conductive lines 1 extended from the patterns, and a bezel area 4 in which the overlap substrate 300 is formed. The overlap substrate may be disposed in the outside region of the substrate like the driving substrate.

If a touch panel separately including the overlap substrate 300 is used as described above, there may be advantages in that visibility in the view area 3 can be improved and process steps and costs for fabricating a display device can be reduced.

FIGS. 9 to 12 are diagrams illustrating examples in which the touch panel in accordance with various embodiments may be applied.

Figure 9:
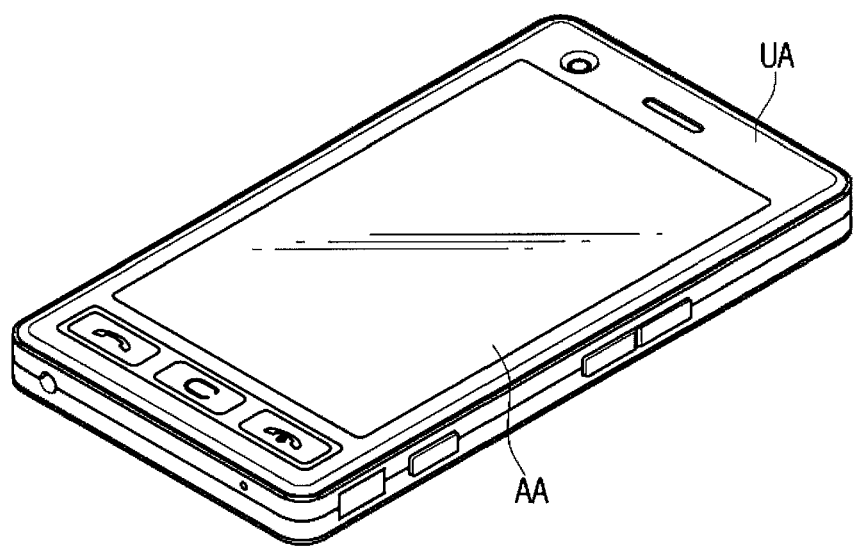

FIG. 9 illustrates an example in which the touch panel in accordance with various embodiments may be applied to a mobile device. The aforementioned touch panel may be applied to the display part of a mobile device.

Figure 10:
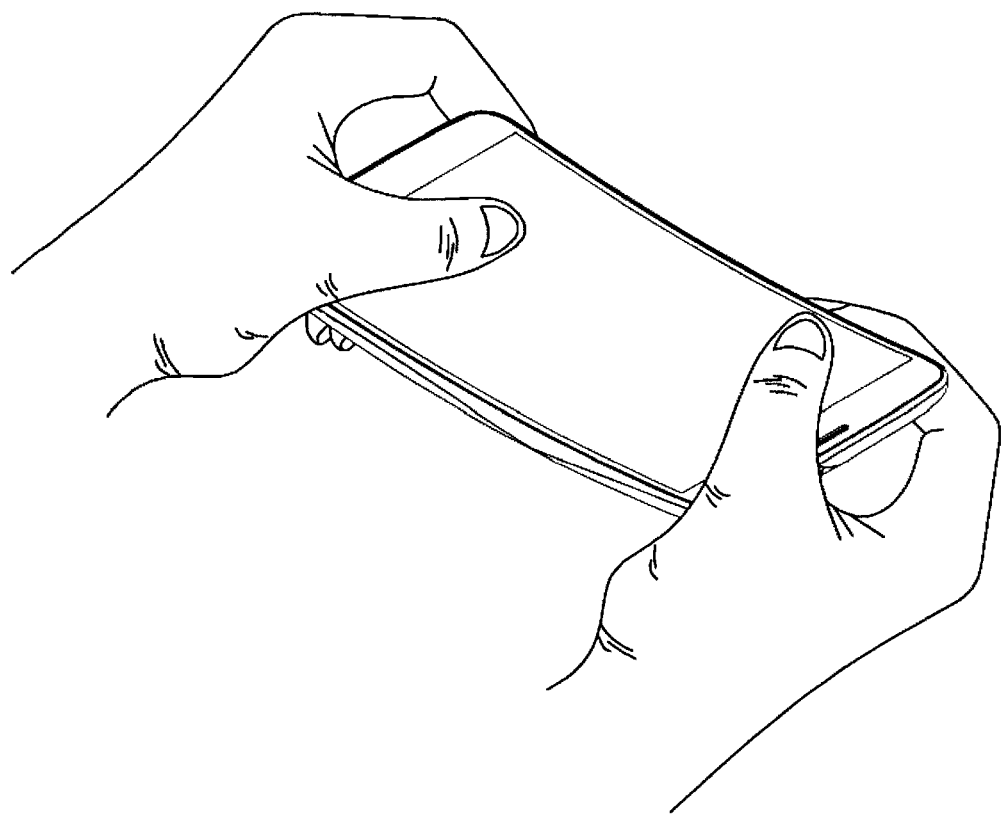

FIG. 10 illustrates a mobile device having a curved surface display. The present embodiment illustrates that a substrate adopts a touch panel that partially has a curved surface and is bent. For example, the substrate may be a touch panel that partially has a flat surface and that partially has a curved surface and a bent shape. More specifically, the end of the substrate may be bent so that it is bent with a curved surface or may be bent or curved so that it has a surface including random curvature. In some embodiments, the substrate itself may be a flexible substrate having a flexible characteristic. In addition, the substrate may be a curved or bent substrate. That is, a touch panel including the substrate may be formed to have a flexible, curved, or bent characteristic. Accordingly, a mobile device to which the touch panel in accordance with an embodiment may be applied can be easily carried and designed in various forms.

Figure 11:
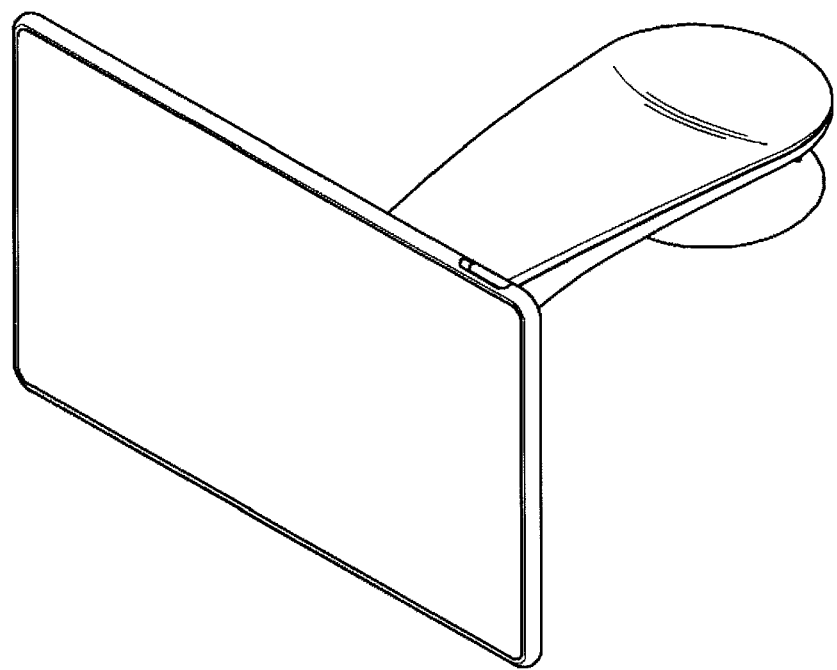

FIG. 11 illustrates an embodiment in which the touch panel in accordance with an embodiment has been formed so that it is attached to and detached from another device through connection means. For example, the touch panel in accordance with an embodiment may be applied to a navigator for a vehicle and may be detachably used in a vehicle.

Figure 12:
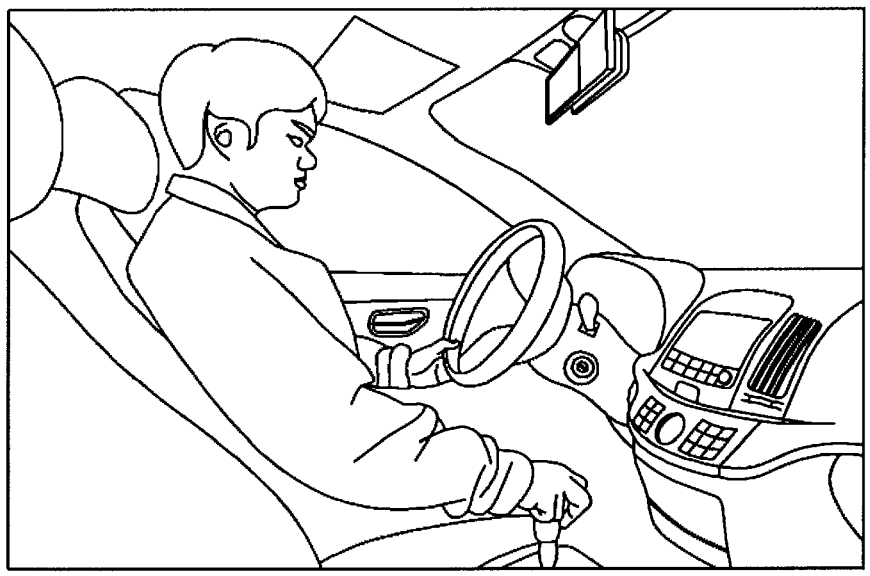

FIG. 12 illustrates an embodiment in which a display for a vehicle has been implemented using the touch panel in accordance with an embodiment. The dash board and front manipulation unit of a vehicle may be implemented by the aforementioned touch panel.

In the above description, the following reference numerals may be used.

1: conductive line
2: base substrate 3: view area 4: bezel area
10a, 10b: intersection structure according to conductive line
20a, 20b: intersection structure according to pattern
30: intersection structure in overlap substrate
100x, 100y: sensing pattern
200x, 200y: electrostatic pattern
250: power coil pattern
255: pad
300: overlap substrate
400: driving substrate
450: integration type substrate
500: insulating layer
600, 800: first and second layers
700: adhesion layer
900: middle layer An embodiment can have advantages in that a cost in the process can be reduced and a process yield can be improved by separately implementing the sensing patterns, as compared to arrangements implemented in only a single layer, in two layers.

An embodiment can have an advantage in that the degree of freedom in selecting a substrate can be increased because different types of substrates can be used without implementing patterns only on a glass substrate when fabricating a single layer.

An embodiment can have advantages in that resistance of conductive lines can be reduced by reducing the length of wires for sensing patterns and a bezel area can be reduced by reducing the number of wires.

An embodiment can have an advantage in that the visibility of a display can be improved by excluding an overlap structure in a view area.

Although preferred embodiments and applications have been illustrated and described, embodiments are not limited to the aforementioned specific embodiments and applications, and those skilled in the art to which the embodiments pertains may modify the embodiments in various ways without departing from the gist of the embodiments which is claimed in the claims. The modified embodiments should not be interpreted individually from the technical spirit or prospect of the present invention.

What is claimed is:

1. A touch panel, comprising:
a plurality of sensing patterns at a substrate and configured to detect a touch signal by detecting an induction electromagnetic force generated from a touch pen, wherein the plurality of sensing patterns are in a mesh form;
a plurality of electrostatic patterns at the substrate and configured to detect an electrostatic input signal; and
an overlap region, provided at an outskirt region of the substrate where conductive lines extend from the electrostatic patterns over the substrate, or provided at a specific region other than the substrate, and wherein the plurality of sensing patterns intersect at the overlap region.

2. The touch panel of claim 1, wherein the mesh form includes a plurality of mesh lines and an opening between adjacent ones of the mesh lines.

3. The touch panel of claim 2, wherein at least one of the mesh lines has a line width of 0.1 µm to 10 µm.

4. The touch panel of claim 1, wherein the plurality of sensing patterns are mutually insulated and intersected at the overlap region.

5. The touch panel of claim 1, further comprising:
an overlap substrate at the overlap region, and
the plurality of sensing patterns are mutually insulated and intersected through a via hole at the overlap substrate.

6. The touch panel of claim 1, further comprising:
an overlap substrate, at the overlap region, having an insulation layer stacked on the overlap substrate, and
the plurality of sensing patterns are mutually insulated and intersected by the insulation layer.

7. The touch panel of claim 1, wherein the plurality of sensing patterns includes:
a plurality of first sensing patterns at a first surface of the substrate; and
a plurality of second sensing patterns at a second surface of the substrate.

8. The touch panel of claim 7, wherein:
an overlap substrate at the overlap region,
the plurality of first sensing patterns are mutually insulated and intersected at a first surface of the overlap substrate, and
the plurality of second sensing patterns are mutually insulated and intersected at a second surface of the overlap substrate.

9. The touch panel of claim 1, further comprising
a plurality of electrostatic patterns at the substrate and configured to detect an electrostatic input;
wherein at least one of the plurality of sensing patterns are disposed between adjacent electrostatic patterns.

10. A touch panel, comprising:
a plurality of sensing patterns at a substrate and configured to detect a touch signal by detecting an induction electromagnetic force generated from a touch pen;
a plurality of electrostatic patterns at the substrate and configured to detect an electrostatic input signal; and
an overlap region, provided at an outskirt region of the substrate where conductive lines extend from the electrostatic patterns over the substrate, or provided at a specific region other than the substrate, and the plurality of sensing patterns intersect at the overlap region, wherein the plurality of sensing patterns are mutually insulated and intersected at the overlap region, and
wherein the plurality of sensing patterns and the plurality of electrostatic patterns are alternately disposed in an active view area of the substrate.

11. The touch panel of claim 10, wherein at least one of the plurality of sensing patterns is disposed between adjacent electrostatic patterns.

12. The touch panel of claim 10, wherein one of the plurality of sensing patterns and the plurality of electrostatic patterns are provided in a mesh form.

13. The touch panel of claim 10, wherein:
a plurality of first sensing patterns and a plurality of first electrostatic patterns at a first surface of the substrate, and a plurality of second sensing patterns and a plurality of second electrostatic patterns at a second surface of the substrate.

14. The touch panel of claim 13, wherein:
an overlap substrate at the overlap region,
the plurality of first sensing patterns is mutually insulated and intersected at the first surface of the overlap substrate, and
the plurality of second sensing patterns are mutually insulated and intersected at the second surface of the overlap substrate.

15. A touch panel, comprising:
a plurality of first sensing patterns formed at a first surface of a substrate in a first direction and configured to detect a touch signal;
a plurality of second sensing patterns formed at a second surface of the substrate in a second direction and configured to detect a touch signal; and
an overlap region over the substrate or a specific region other than the substrate, and the plurality of first sensing patterns are mutually insulated and intersected at a first surface of the overlap region.

16. The touch panel of claim 15, wherein:
an overlap substrate at the overlap region,
the plurality of second sensing patterns are mutually insulated and intersected at a second surface of the overlap substrate.

* * * * *